Dec. 20, 1966  L. K. HANSEN  3,293,491
APPARATUS FOR PRODUCING CHARGED PARTICLES
Filed Feb. 13, 1962
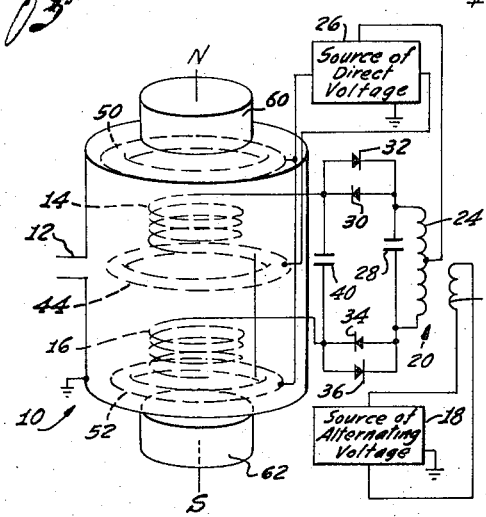
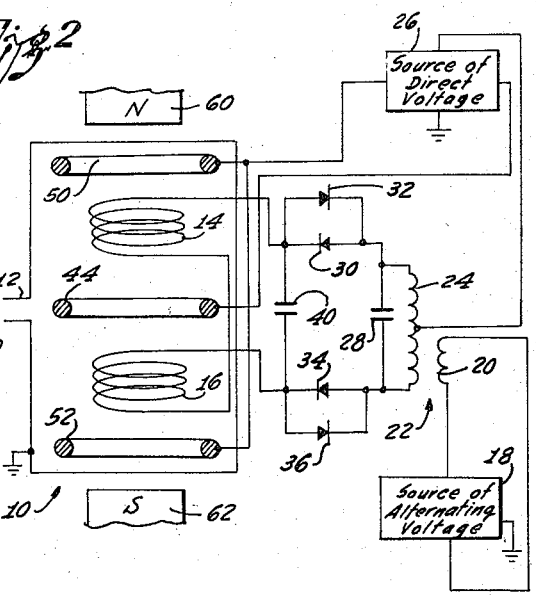
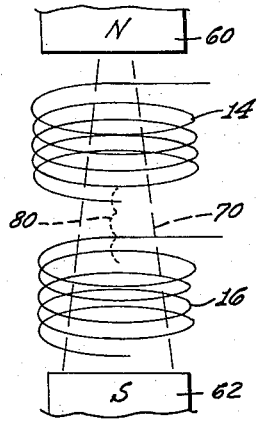
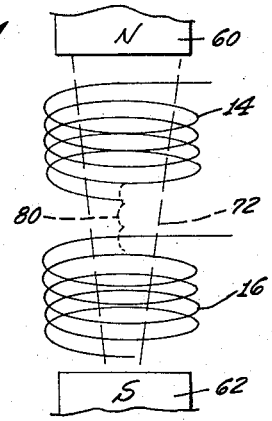
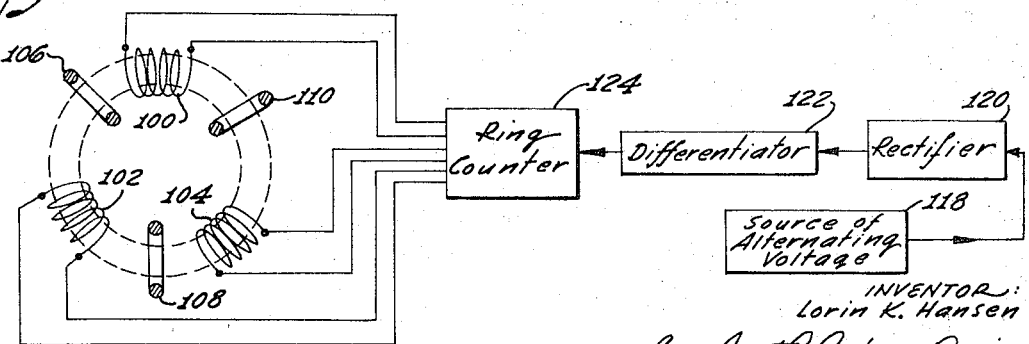
INVENTOR:
Lorin K. Hansen
Attorneys United States Patent Office 3,293,491
Patented Dec. 20, 1966

3,293,491
APPARATUS FOR PRODUCING CHARGED
PARTICLES
Lorin K. Hansen, Santa Monica, Calif., assignor, by mesne assignments, to Robert A. Cornog, Woodland Hills, Calif.
Filed Feb. 13, 1962, Ser. No. 172,962
14 Claims. (Cl. 315—111)

This invention relates to apparatus for producing charged particles and more particularly relates to apparatus for providing an efficient production of charged particles. The apparatus constituting the invention is especially adapted to be used as a source for indicating the number of molecules of gas in an enclosure or as an ion source or a vacuum pump.

As the age of automation progresses, it becomes increasingly important to provide sensitive and reliable measurements to control the automatic operation of various industrial processes. One of the measurements relates to the number of molecules of gas in an enclosure. For example, such measurements are necessary in systems for producing various chemicals by controlling the introduction of various elements to an enclosure to obtain a chemical reaction of the different elements in the enclosure.

As the age of automation progresses, it is also becoming increasingly important to provide systems which operate effectively at vacuum pressures. In these systems, the number of molecules has to be controlled effectively to maintain the vacuum pressure within particular limits. It is also becoming increasingly important to provide systems which are capable of producing ions which are then introduced to other measuring and indicating apparatus for controlling the proper operation of such measuring and indicating apparatus.

Numerous attempts have been made in the past to provide equipment for measuring with precision the number of molecules of gas in an enclosure and also to provide equipment for obtaining an efficient production of ions and for maintaining a vacuum within an enclosure. Such ateempts have not been completely satisfactory until recently for various reasons. One reason has been the occurrence of electrical sparking or sputtering between the electrodes in the equipment and the walls defining the housing for the equipment. This sparking or sputtering has occurred because of the high voltages, such as in the order of 2,000 volts, required for use in the equipment and because of the close spacing which has had to be provided between the electrodes and the walls defining the housing.

A further disadvantage in the equipment of the prior art has resulted from the secondary emission of electrons from the walls defining the enclosure. These electrons have then been accelerated by the electrodes within the enclosure to produce an ionization of molecules of gas within the enclosure. The sparking or sputtering between the electrode and the walls defining the enclosure and the production of charged particles from secondarily emitted electrons have considerably reduced the sensitivity and reliability of the measurements which have been made to indicate the number of charged particles produced from molecules of gas within the enclosure.

In copending application Serial No. 133,407 filed by me, apparatus is disclosed and claimed for overcoming the above disadvantages. The apparatus produces charged particles without secondary emission of electrons from the walls contributing to the production. The apparatus provides a pair of electrodes both of which are connected to receive a relatively low voltage in the order of +200 volts and which are disposed a relatively great distance from the walls defining the enclosure. Since the electrodes are at a relatively low voltage and are spaced from the walls defining the enclosure, no sparking or sputtering occurs even when a considerable number of charged particles are present within the enclosure.

In the ionization gauge disclosed and claimed in copending application Serial No. 133,407, first and second electrodes are disposed in spaced relationship to each other and are provided with a configuration to retain electrons within the electrodes. Each of the electrodes is provided with an opening which faces the opening in the other electrode so that the electrons are able to move in a reciprocal path between the electrodes through the openings in the electrodes. The positive direct voltage of +200 volts is applied to the electrodes to retain electrons within the enclosure and to inhibit the movement of the electrons toward the walls defining the enclosure.

An alternating voltage is also applied to the electrodes in a particular relationship to produce opposing phases on each of the first and second electrodes. This causes the electrons in one of the electrodes to be initially attracted to the second electrode and thereafter to oscillate within the second electrode during a first half cycle of the alternating voltage. In the next half cycle of the alternating voltage the electrons in the second electrode become attracted to the first electrode and oscillate within the first electrode. During the movement of the electrons between the electrodes and during the oscillatory movement of the electrons within the electrodes in each half cycle of the alternating voltage, the electrons strike molecules of gas within the enclosure with a sufficient force to ionize these molecules. In this way, a cumulative number of molecules of gas are ionized in the successive half cycles of the alternating voltage.

The ionization gauge disclosed and claimed in copending application Serial No. 133,407 is constructed to channel the movement of electrons between the first and second electrodes so that many of the electrons are not able to strike the electrodes or the walls defining the enclosure. This is obtained by disposing magnetic poles to produce a magnetic field in an axial direction corresponding to the direction of reciprocal movement of the electrons. Furthermore, any electrons secondarily emitted from the walls defining the enclosure are returned to the walls to prevent such electrons from ionizing molecules of the gas within the enclosure. In this way, only the electrons produced from the molecules of gas within the enclosure by the movement of charged particles between the first and second electrodes are efficiently used to produce further electrons without any secondary emission of electrons from the electrodes or the walls defining the enclosure.

This invention provides an improvement of the ionization gauge disclosed and claimed in copending application Serial No. 133,407. In this invention, the first and second electrodes are constructed to produce a converging force on the charged particles during the movement of the charged particles between the first and second electrodes. This converging force acts on the charged particles to concentrate the charged particles toward the axial line extending between the first and second electrodes. By concentrating the charged particles toward the axial line in each reciprocal movement of the charged particle between the first and second electrodes, the charged particles are prevented from diffusing to the electrodes and from becoming lost. In this way, the charged particles are retained near the axial position to ionize molecules of gas effectively during the reciprocal movements of the charged particles between the first and second electrodes.

In one embodiment of the invention, each of the first and second electrodes is defined by a coil having a plurality of turns. The coils are disposed in spaced relationship to each other along a common axis corresponding to the direction of reciprocal movement of the electrons. The coils are connected to produce magnetic flux in a phase relationship wherein the flux from one of the coils aids the magnetic flux from the poles and the flux from the other coil opposes the magnetic flux from the poles. This produces an increased concentration of magnetic flux adjacent to one of the coils and a decreased concentration of magnetic flux adjacent to the other coil. The electrons become concentrated along the common axial line between the coils by producing a movement of electrons from the coil having the decreased concentration of magnetic flux to the coil having the increased concentration of magnetic flux. The electrons become concentrated during each reciprocal movement by introducing alternating voltages to the coils to obtain an increase of flux at one of the coils in alternate half cycles and an increase of flux at the other coil in the other half cycles.

The use of coils as the first and second electrodes is further advantageous in that the coils can be used as electrical elements with a capacitor to define a tuned circuit. This tuned circuit can be provided with a frequency corresponding to that of the alternating voltage applied to the coils to produce the reciprocal movement of the electrons between the coils. By connecting the coils in a tuned circuit, the production of harmonics is minimized and the reciprocal movement of the electrons is controlled at the fundamental frequency of the alternating voltage.

In the drawings:

FIGURE 1 is a schematic view, partially in perspective and partially in block form, of an improved ionization gauge constituting one embodiment of the invention;

FIGURE 2 is a schematic view, partially in section and partially in block form, further illustrating the construction of the embodiment shown in FIGURE 1;

FIGURES 3 and 4 are schematic views illustrating the operation of the improved ionization gauge shown in FIGURE 1 in facilitating a controlled and reciprocal movement of charged particles and in spatially concentrating the charged particles during such reciprocal movement; and FIGURE 5 is a schematic view, partially in section and partially in block form, illustrating a second embodiment of the improved ionization gauge constituting this invention.

In the embodiment of the invention shown in FIGURES 1 and 2, an enclosure 10 is formed from an electrical conductor having non-magnetic properties, brass or stainless steel being good examples. The enclosure 10 may be in the form of a cylinder and is at a suitable reference potential such as ground. The enclosure 10 is provided with a conduit 12 to receive molecules of gas from any suitable source (not shown).

A pair of electrodes preferably formed as coils 14 and 16 are disposed within the enclosure 10. Each of the coils 14 and 16 is preferably disposed to define a cylinder such that the axis of each cylindrical coil corresponds to the axis of the other cylindrical coil. Each of the coils 14 and 16 may be formed from a plurality of helical turns. By way of illustration, the coils 14 and 16 may be provided with a diameter in the order of 1½ inches and with an axial length in the order of ½ inch. The electrodes 14 and 16 may be separated from each other by a distance in the order of ½ inch. Each of the electrodes 14 and 16 may be formed from 6 turns of No. 8 wire.

The coils 14 and 16 are connected in an electrical circuit to receive an alternating voltage from a source 18. The source 18 is connected in a circuit with the primary winding 20 of a transformer generally indicated at 22. The source 18 is adapted to provide alternating signals at a suitable frequency such as 2 megacycles per second. The secondary winding 24 of the transformer 22 is provided with a center tap which is connected to a source 26 of direct voltage to receive a suitable potential such as +200 volts.

A capacitor 28 is connected across the end terminals of the secondary winding 24 to provide a parallel resonant circuit which is tuned to the frequency of the alternating voltage from the source 18. The upper end terminal of the secondary winding 24 in FIGURE 2 is also connected to the anode of a diode 30 and to the cathode of a diode 32. The cathode of the diode 30 and the anode of the diode 32 are connected to the upper terminal of the coil 14 in FIGURE 2.

In like manner, connections are made from the lower end terminal of the secondary winding 24 in FIGURE 2 to the anode of a diode 34 and to the cathode of a diode 36. The cathode of the diode 34 and the anode of the diode 36 have a common connection with the upper end terminal of the winding 16 in FIGURE 2. A lead extends electrically between the lower end terminals of the coils 14 and 16 in FIGURE 2. A capacitor 40 is disposed electrically between the upper end terminals of the coils 14 and 16 in FIGURE 2. The capacitor 40 is provided with a value to produce with the coils 14 and 16 a parallel resonant circuit which is tuned to the frequency of the alternating voltage from the source 18.

The alternating voltage introduced to the coils 14 and 16 may have a peak amplitude in the order of +50 volts although peak amplitures as low as 20 volts or lower or as high as 20 volts or higher may also be used. The alternating voltage introduced to the coil 14 has a displaced phase relationship relative to the alternating voltage introduced to the coil 16. For optimum efficiency in the production of electrons and ions from the molecules of gas within the enclosure 10, the phase displacement between the alternating voltages introduced to the coils 14 and 16 is preferably 180°.

A grid 44 is disposed between the coils 14 and 16 in equally spaced relationship to the coils in the axial direction. The grid 44 is provided with a hollow annular configuration and is disposed with its center on the axis defining the coils 14 and 16 and the enclosure 10. The grid 44 is made from an electrically conductive material having non-magnetic properties, brass or stainless steel being good examples. The grid 44 is connected to the source 26 of direct voltage to receive a suitable biasing potential such as +100 volts when direct potentials of +200 volts are applied to the coils 14 and 16.

A grid 50 is disposed between the coil 14 and the wall defining the upper face of the enclosure 10. The grid 50 may be provided with a hollow annular configuration and is disposed with its center on the axis common to the coils 14 and 16. The grid 50 is made from a suitable material having non-magnetic properties, brass or stainless steel being good examples. The grid 50 is connected to receive a suitable negative potiential such as −100 volts from the source 26. A grid 52 having a construction corresponding to that of the grid 50 is disposed between the coil 16 and the bottom wall defining the enclosure 10. The grid 52 is disposed in axially aligned relationship with the grid 50 and is connected to receive the potential of −100 volts from the source 26.

The charged particles within the enclosure 10 are subjected to a magnetic field as by a pair of magnetic poles 60 and 62. The pole 60 may constitute a north pole and the pole 62 may constitute a south pole. The poles 60 and 62 are disposed at opposite ends of the enclosure 10 along the axis common to the coils 14 and 16 and the walls defining the enclosure 10. By way of illustration, the poles 60 and 62 may be constructed to produce a magnetic field in the order of 100 gauss although the poles may be constructed to produce increased magnetic fields up to 1,000 gauss and higher. Athough the poles 60 and 62 are preferably formed from permanent magnets, it should be appreciated that the poles may also constitute electromagnets in which magnetic fields are produced by passing an electrical current through coils disposed around the poles.

Some electrons always exist within the enclosure 10. These electrons tend to be attracted into the spaces within the coils 14 and 16 since the coils receive positive potentials and since the coils 14 and 16 have substantially no electrical field within the spaces defined by the electrodes. During the time that no alternating voltage is introduced from the source 38 to the coils 14 and 16, the electrons tend to oscillate in a random pattern within the spaces defined by the electrodes.

Upon the introduction of an alternating voltage from the source 18 to the coils 14 and 16, the voltage on one of the coils tends to rise at the same time that voltage on the other coil is falling. This potential difference causes the electrons within one of the coils 14 and 16 to be attracted toward the other coil. For example, the electrons are attracted from the coil 14 to the coil 16 when the potential on the coil 16 rises above the potential on the coil 14. The electrons become accelerated during their movement from the coil 14 to the coil 16 so that the electrons travel into the space within the coil 16 at a considerable speed and with a considerable energy. This causes the electrons to ionize molecules of gas within the coil 16 when the electrons strike such molecules of gas.

In the next half cycle of the alternating voltage from the source 18, the potential on the coil 14 rises above the potential on the coil 16. This causes the electrons within the coil 16 to be attracted toward the coil 14. When the electrons reach the coil 14, they strike molecules of gas within the coil 14 so as to ionize such molecules. After the electrons reach the coil 14, they tend to oscillate within the coil 14 during the remainder of the half cycles of the alternating voltage. The electrons tend to strike molecules of gas and ionize such molecules during their oscillatory movements within the coil 14.

In this way, a progressive number of electrons in produced in each successive half cycle of the alternating voltage from the source 18. As the number of electrons within the enclosure 10 increases, the probability increases that the electrons will strike molecules of gas and ionize molecules. Because of this, a cumulative number of electrons is produced from the molecules of gas in the successive half cycles of the alternating voltage from the source 18. The electrons are produced from the molecules of gas during the reciprocal movement of the previously produced electrons between the coils 14 an 16 and during the oscillatory movement of such previously produced electrons within the coils.

The electrons move in a reciprocal path between the coils 14 and 16 through the axial openings in the coils without tending to strike the turns of wire defining the coils. This results in part from the action of the poles 60 and 62 in channeling the movement of the electrons in a direction substantially parallel to the axis common to the coils 14 and 16 and the source defining the enclosure 10. The poles 60 and 62 provide such a channeling action on the electrons because the lines of magnetic flux between the poles are in a direction parallel to the axial line common to the coils 14 and 16 and the walls defining the enclosure 10. It will be appreciated that the electrons may tend to deviate in a direction transverse to the axial direction in spite of the magnetic field produced in the axial direction by the poles 60 and 62. This deviation may result in part from an epicyclic movement of the electrons as indicated at 80 in FIGURE 3. The epicyclic movement may be produced by a combination of the magnetic and electrical fields produced upon the electrons, the electrical field in turn resulting in part from the repelling force produced between adjacent electrons. Because of some tendency for the electrons to deviate from the axial direction, it is desirable to produce other forces for maintaining the movement of the ions in an axial direction between the coils 14 and 16.

The coils 14 and 16 are also instrumental in insuring that the electrons move in an axial direction in a reciprocal path between the coils without striking the turns of wire defining the coils. This results from the magnetic fields produced by the coils 14 and 16 in each half cycle of the alternating voltage from the source 18. In the positive half cycles of the alternating voltage from the source 18, current flows through a circuit including the diode 30, the coil 14, the coil 16, the diode 36 and the secondary winding 24. As will be seen, the current flows downwardly through the coil 14 and upwardly through the coil 16 in FIGURE 2. This causes the flux produced by the flow of current through the coil 14 to be in the same direction as the flux passing from the pole 60 to the pole 62. However, the flux produced by the flow of current through the coil 16 is in a direction opposite to the flux passing from the pole 60 to the pole 62.

Since the fluxes produced by the poles 60 and 62 and by the flow of current through the coil 14 tend to aid each other, the lines of flux are relatively concentrated within and adjacent to the coil 14 in the positive half cycles of the alternating voltage from the source 18. However, the lines of flux are somewhat loosely dispersed within and adjacent to the coil 16 because of the opposing effect of the flux produced by the flow of current through the coil 16 and the flux passing between the poles 60 and 62. Since many of the lines of flux passing through the coil 14 also link the coil 16, the resultant pattern of flux is somewhat convergent from the coil 16 to the coil 14. This is indicated schematically in broken lines at 70 in FIGURE 3.

During the positive half cycles in which the flux between the coils 14 and 16 have the convergent pattern 70, the electrons are attracted from the coil 16 to the coil 14 because of the positive voltage on the coil 14 relative to the voltage on the coil 16. As the electrons travel from the coil 16 to the coil 14, they tend to move in paths corresponding to the lines of flux produced between the coils 14 and 16. This causes the electrons to become concentrated in an axial direction in accordance with the convergent pattern 70 of the flux as the electrons move from the coil 16 to the coil 14. This concentration of the electrons is instrumental in preventing the electrons from striking the turns of wire defining the coil 14.

In the negative half cycles of the alternating voltage from the source 18, current flows through a circuit including the diode 34, the coil 16, the coil 14, the diode 32 and the secondary winding 24. As will be seen, the flow of current in the coil 16 is in a direction to obtain the production of flux which aids the flux passing from the pole 60 to the pole 62. However, the flux produced by the flow of current through the coil 14 is in a direction to oppose the flux passing from the pole 60 to the pole 62. This causes the flux to have a convergent pattern, as indicated schematically in broken lines at 72 in FIGURE 4. As will be seen, the convergent pattern 72 in FIGURE 4 is opposite to the convergent pattern 70 in FIGURE 3.

During the half cycles in which the flux between the coils 14 and 16 has the convergent pattern 72, the electrons move from the coil 14 to the coil 16 because of the positive voltage on the coil 16 relative to the voltage on the coil 14. Since the electrons tend to follow the lines of flux as indicated by the convergent pattern 72, the electrons tend to converge toward the axis common to the coils 14 and 16 as they move from the coil 14 to the coil 16. This causes the electrons to move within the coil 16 without striking the coil when the electrons reach the coil.

It will be seen from the previous discussion that a converging action is produced on the electrons during the movement of the electrons between the coils 14 and 16 in each half cycle of the alternating voltage. This converging action minimizes any tendency for the electrons to strike the turns of wire defining the coils 14 and 16. The converging action also minimizes any tendency for the electrons to drift from the space in which the electrons receive optimum energy from the voltages applied to the coils 14 and 16. Because of this, all of the electrons are used in each reciprocal movement of the electrons between the coils 14 and 16 to obtain an ionization of molecules of gas and to obtain the production of further electrons and positively charged particles.

As will be seen in FIGURE 2, the coils 14 and 16 are connected in a parallel resonant circuit with the capacitor 40. This parallel circuit is resonant at a frequency corresponding to the frequency of the alternating voltage from the source 18. By electrically connecting the coils 14 and 16 in a circuit resonant at the fundamental frequency of the voltage from the source 18, the operation of the coils 14 and 16 at the fundamental frequency is enhanced. This insures that the electrons will move in the reciprocal path between the coils 14 and 16 with an optimum amount of concentration in the axial direction. The reason is the harmonics of the fundamental frequency tend to distort the flux produced by the flow of current through the coils 14 and 16.

The grid 44 is instrumental in insuring that the electrons strike molecules of gas with sufficient force to ionize the molecules. This results from the bias introduced to the grid 44 from the source 26 relative to the positive potential applied to the coils 14 and 16 from the source. This bias causes the electrons to move between the coils 14 and 16 only in the portions of each alternation where the potential has an increased value relative to the value of the potential at the initiation of each alternation. The bias on the grid 44 relative to the potential on the coils 14 and 16 prevents electrons from moving between the coils 14 and 16 during the time that no alternating voltage is introduced to the coils from the source 18.

The grid 44 also prevents the electrons from moving between the coils 14 and 16 during the time that the alternating potential from the source 18 has established a relatively low voltage difference between the coils 14 and 16. In this way, the electrons are able to move between the coils 14 and 16 only as the alternating potential from the source 18 approaches its peak value in each half cycle. Because the electrons are able to move between the coils 14 and 16 only at the peak of the alternating voltage from the source 18, the electrons acquire an optimum amount of energy during their motion between the coils 14 and 16. This insures that the electrons will strike molecules of gas within the coils 14 and 16 with increased probability of ionizing such molecules. The grid 44 is accordingly instrumental in assuring that the ionization gauge constituting this invention operates efficiently in producing electrons and positive ions from the molecules of gas within the enclosure.

The grid 44 is also instrumental in another important way in assuring that the ionization gauge constituting this invention operates efficiently in ionizing the molecules of gas within the enclosure 10 at an optimum rate. This results from the operation of the grid 44 in each half cycle of the alternating voltage from the source 18 in delaying the movement of the electrons between the coils 14 and 16. This delay causes the electrons to remain an increased length of time within one of the coils 14 and 16 in each half cycle of the alternating voltage. During the time that the electrons remain within each of the coils 14 and 16, they have an oscillatory movement because of the opposing forces produced on the electrons by the coils. Because of their oscillatory movement within each of the coils 14 and 16, the electrons have an increased opportunity to strike molecules of gas and ionize such molecules.

The electrons moving in the reciprocal path between the coils 14 and 16 do not strike the walls defining the enclosure 10. This results from the positive potential on the coils 14 and 16 relative to the potential on the walls defining the enclosure 10. It also results from the considerable distance between the electrodes and the walls defining the enclosure 10.

The positive ions produced from the molecules of gas within the enclosure 10 may tend to drift toward the walls defining the enclosure 10 since the grounded potential on the walls defining the enclosure 10 is negative with respect to the positive potential on the coils 14 and 16. The positive ions will generally not strike the wall defining the enclosure 10 with a sufficient force to produce a significant secondary emission of electrons from such walls. The reason is that the potential difference between the coils 14 and 16 and the walls defining the enclosure 10 is relatively low.

As will be seen, the openings in the grids 44, 50 and 52 are greater than the openings in the coils 14 and 16. Because of the increased openings in the grids 44, 50 and 52, any electrons secondarily emitted from the grids are inhibited from moving in a path which would cause them to join the electrons moving in a reciprocal path between the coils 14 and 16.

Any electrons secondarily emitted from the walls defining the enclosure 10 are repelled by the grids 50 and 52 so as to return to the walls. In this way, the electrons secondarily emitted from the walls defining the enclosure 10 are prevented from moving into the region within the coils 14 and 16 to join the electrons produced from the molecules of gas within the enclosure. Because of this, only the electrons produced from the molecules of gas within the enclosure 10 are instrumental in producing the ionization of other molecules of gas within the enclosure into electrons and positive ions.

The apparatus constituting the invention has certain important advantages. It provides an efficient production of electrons from the molecules of gas within the enclosure 10. The electrons are produced entirely from the molecules of gas within the enclosure 10 and are not obtained from any secondary emission of electrons from the coils 14 and 16 and the walls defining the enclosure 10. This results in part from the action of the various members in channeling the movement of electrons along substantialy the axial line which extends between the coils 14 and 16. This causes the apparatus constituting this invention to constitute a source of charged particles whereby an improved control is obtained over the production of the charged particles in comparison to the sources now in use.

Since the electrons are produced entirely from molecules of gas, the walls defining the enclosure 10 cannot be contaminated chemically with positive ions obtained from molecules of the different gases within the enclosure 10. Even if the walls defining the enclosure 10 in the apparatus constituting this invention should be contaminated by the molecules of the different gases, this does not affect the operation of the apparatus since the charged particles in the apparatus are not obtained from the walls.

The apparatus constituting the invention may be used as an ion source or as a vacuum pump in addition to its use as an ionization gauge. When the apparatus constituting this invention is used as an ion source, the positive ions produced within the enclosure 10 from the molecules of gas within the enclosure are channeled through an opening in the enclosue to output apparatus which uses the ions. When the apparatus constituting this invention is used as a vacuum pump, the ions produced from the molecules of gas within the enclosure 10 are channeled through the opening in the enclosure and are collected after passing through such opening. Since the ions are withdrawn from the enclosure, the molecules of gas in the enclosure 10 eventually become considerably reduced in number.

A second embodiment of the invention is illustrated in FIGURE 5. In the second embodiment, a plurality of coils 100, 102 and 104 are equally spaced in an arcuate direction about an annulus. Each of the coils 100, 102 and 104 may be formed from a number of turns which are disposed relative to one another to define an arcuate configuration. As will be appreciated, each of the coils 100, 102 and 104 constitutes an electrode in a manner similar to the coils 14 and 16 in the embodiment shown in FIGURES 1 to 4, inclusive.

Grids 106, 108 and 110 are respectively disposed between adjacent pairs of the coils 100, 102 and 104. The grids 106, 108 and 110 are equaly spaced from the adjacent coils 100, 102 and 104 in the arcuate direction and are disposed with their centers on the annulus defined by the coils 100, 102 and 104. Each of the grids 106, 108 and 110 is constructed in a manner similar to that described above for the grid 44 in the embodiment shown in FIGURES 1 to 4, inclusive.

The coils 100, 102 and 104 are connected in a particular relationship to receive the alternating voltage from the source 18 and in successive half cycles of the voltage. For example, in a first half cycle of voltage from a source 118 corresponding to the source 18 in FIGURES 1 to 4, inclusive, a positive voltage may be introduced to the coil 102 and a negative voltage may be introduced to the coil 100. This causes the electrons to move from the coil 100 to the coil 102 and to ionize molecules of gas during such movement and during the subsequent oscillatory movements of the electrons within the coil 102.

The source 118 is connected to a rectifier 120 which inverts the negative half cycles of voltage to produce only positive half cycles in the sucessive half cycles of voltage. The rectifier 120 is in turn connected to a differentiator 122 to produce a sharp triggering signal at the beginning of each half cycle of voltage from the differentiator. The signals from the differentiator 122 are in turn introduced to a ring counter 124 which is constructed in a conventional manner.

The ring counter 124 is responsive to successive pulses from the differentiator 122 to introduce a positive voltage in the successive half cycles of the alternating voltage to progressive ones of the coils 100, 102 and 104. Because of this, a positive voltage is introduced from the source 118 to the coil 104 in the second half cycle of voltage from the source 118 and a negative voltage is simultaneously introduced to the coil 102. This causes the electrons to move from the coil 102 to the coil 104 in the second half cycle of the alternating voltage from the source 118 and to ionize molecules of gas during such movement and during the subsequent oscillatory movement of the electrons within the coil 104.

In a third half cycle of the alternating voltage from the source 118, the coil 100 receives a positive voltage and the coil 104 receives a negative voltage. The electrons accordingly move from the coil 104 to the coil 100 and ionize molecules of gas during such movement and during the subsequent oscillatory movement of the electrons within the coil 100. In this way, the electrons move in a counterclockwise direction to successive ones of the coils 100, 102 and 104 in the progressive half cycles of voltage from the source 118 and ionize molecules of gas so as to produce a cumulative number of electrons.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for obtaining a controlled production of charged particles from a plurality of molecules of a gas, first electrode means for obtaining a movement of charged particles toward and away from the first electrode means; second electrode means for obtaining a movement of charged particles toward and away from the second electrode means; the first and second electrode means being displaced from each other in a particular direction and being constructed to produce forces on the charged particles, upon the introduction of a voltage to the electrode means and in accordance with the introduction of a voltage to the electrode means, in a direction for obtaining a movement of charged particles between the electrode means and for concentrating the charged particles during the movement of the charged particles between the electrode means; means operatively coupled to the first and second electrode means for introducing alternating voltages to the first and second electrode means in an opposing phase relationship to produce a first force between the electrode means for obtaining a movement of the charged particles between the first and second electrode means at a frequency directly related to the frequency of the alternating voltage and for obtaining an oscillatory movement of the charged particles at the first and second electrode means between each movement of the charged particles and for obtaining the ionization of molecules of gas by the charged particles during the movements of the charged particles; means displaced from the first and second electrode means in the particular direction for producing a second force on the charged particles in cooperation with the first force to obtain a concentration of the charged particles during the movement of the charged particles between the electrode means; and means for introducing the plurality of molecules of a gas into the space between the first and second electrode means.

2. In combination for obtaining a controlled production of charged particles from a plurality of molecules of a gas, first electrode means for obtaining a movement of charged particles into and out of the first electrode means, second electrode means for obtaining a movement of charged particles into and out of the second electrode means, the first and second electrode means being displaced from each other in a particular direction to produce first forces on the charged particles in accordance with any differences in the voltages on the first and second electrode means for obtaining a movement of the charged particles from one of the electrode means to the other, means displaced from the first and second electrode means in a particular direction for producing a second force on the charged particles in a direction for facilitating a direct movement of the charged particles between the first and second electrode means, the first and second electrode means being constructed and electrically connected to each other in a particular relationship to produce on the charged particles third forces in accordance with the introduction of voltages to the electrode means wherein the third forces cooperate with the second forces in concentrating the charged particles in a second direction transverse to the particular direction during the movement of the charged particles between the electrode means, and means operatively coupled to the first and second electrode means for introducing alternating voltages to the first and second electrode means in a particular phase relationship to obtain the production of the first and third forces by the first and second electrode means for a movement of the charged particles between the first and second electrode means at a frequency directly related to the frequency of the alternating voltage and for a concentration of the charged particles during such movement and for an oscillatory movement of the charged particles at the electrode means between such movements of the charged particles and for the production of further charged particles by the charged particles from the molecules of gas during such movements of the charged particles.

3. In combination for obtaining a controlled production of charged particles from a plurality of molecules, means including at least one wall defining a controlled space, means extending from the wall for obtaining the introduction of the plurality of molecules into the controlled space, first and second means disposed within the controlled space and in spaced relationship to each other in a particular direction to produce a field having properties of producing on the charged particles forces directed between the first and second means and converging at a particular one of the first and second means to obtain a convergence of the charged particles during a movement of the charged particles in a controlled path to the particular one of the first and second means from the other one of the first and second means, means operatively coupled to the first and second means for introducing alternating voltages to the first and second means in a particular phase relationship to obtain a movement of charged particles in the controlled path between the first and second means and to obtain an oscillatory movement of the charged particles between such movements and to obtain the production of further charged particles from the molecules during such movements of the charged particles, and means displaced from the first and second means in the particular direction for producing a force on the charged particles upon the movement of the charged particles to the first and second means to retain the charged particles in the space between the first and second means without engaging the first and second means.

4. In combination for obtaining a controlled production of charged particles from a plurality of molecules, first electrode means having a hollow configuration defining a first controlled space within the first electrode means, second electrode means having a hollow configuration defining a second controlled space within the second electrode means, the first and second electrode means being disposed in spaced relationship to each other to provide a movement of charged particles between the first and second electrode means and being electrically connected to each other to produce on the charged particles a force converging toward the controlled space of a particular one of the first and second electrode means in accordance with any difference in voltages on the first and second electrode means, means displaced from the first and second controlled spaces for introducing the plurality of molecules into the space between the first and second controlled spaces, means operatively coupled to the first and second electrode means for alternately applying potentials to the first and second electrode means to produce a first force on the charged particles for obtaining movement of charged particles between the first and second electrode means and an oscillatory movement of the charged particles during the period between such movements of the charged particles and to obtain the production of further charged particles during such movement of the charged particles, and means operative upon the charged particles and displaced from the first and second electrode means for producing a second force on the charged particles to cooperate with the first force on the charged particles in obtaining a concentration of the charged particles during the movement of the particles between the first and second electrode means.

5. In combination for obtaining a controlled production of charged particles from a plurality of molecules of a gas, a first coil formed from a first plurality of turns disposed to define a first hollow electrode, a second coil formed from a first plurality of turns disposed to define a second hollow electrode, the first and second coils being displaced from each other in a particular direction and being connected to each other to receive a voltage for producing an electrical field between the coils to obtain a movement of charged particles between the coils in accordance with the polarity of the electrical field, means displaced from the first and second coils in the first direction for producing a first magnetic field in the particular direction between the coils, the first and second coils being further connected to produce second magnetic fields of opposite polarities upon a flow of current through the coils wherein the magnetic field produced by one of the coils aids the first magnetic field to produce a concentration of lines of flux and wherein the magnetic field produced by the other coil opposes the first magnetic field to produce a dispersal of the lines of flux, and means operatively coupled to the first and second coils for introducing an alternating voltage to the coils in a particular phase relationship to produce an increase in voltage on one of the coils and a decrease in voltage on the other coil in each half cycle and to obtain the production of the electrical field and the second magnetic field by the coils in accordance with the voltage at each instant and to obtain a movement of the charged particles between the electrodes in each half cycle and a concentration of the charged particles between each movement of the charged particles and an oscillatory movement of the charged particles within the coils between each movement of the charged particles and the production of further charged particles from the molecules of gas during the movements of the charged particles.

6. In combination for obtaining a controlled production of charged particles from a plurality of molecules of a gas, a first coil formed from a plurality of turns displaced from one another in a particular direction to define a first hollow opening, a second coil formed from a plurality of turns displaced from one another in the particular direction to define a second hollow opening, the first and second coils being displaced from each other in the particular direction to produce an electrical field between the coils in the particular direction for producing a movement of the charged particles between the first and second coils through the openings in the coils, the first and second coils being connected in an opposed relationship to obtain the production of magnetic flux in one direction by a particular one of the coils and the production of magnetic flux in an opposite direction by the other coil in accordance with the magnitude and polarity of any flow of current through the coils, means displaced from the first and second coils in the particular direction for producing a magnetic field between the first and second coils for a reinforcement of this magnetic field by the flux produced by one of the coils and for a dilution of this magnetic field by the flux produced by the other coil to obtain a concentration of the charged particles during the movement of the charged particles between the first and second coils, an enclosure housing the first and second coils and having walls defining the enclosure, means connected to the first and second coils for introducing a direct voltage to the coils for maintaining the charged particles from the walls defining the enclosure, and means connected to the coils for introducing an alternating voltage to the coils in an opposing phase relationship to produce an alternating electrical field for a reciprocal movement of the charged particles between the first and second coils and for an oscillatory movement of the charged particles within the coils between the reciprocal movements and for the production of further charged particles from the molecules of gas during the reciprocal and oscillatory movements of the charged particles.

7. The combination set forth in claim 6, including, a grid disposed between the first and second coils and constructed to provide for the reciprocal movement of the charged particles through the grid, and means operatively coupled to the grid for introducing a direct voltage of a particular magnitude and polarity relative to the direct voltage introduced to the first and second coils to control the electrical field between the coils for the movement of the charged particles between the coils for alternating voltages approaching peak values in each half cycle.

8. The combination set forth in claim 7 in which each of the first and second coils is provided with a cylindrical configuration and in which the first and second coils are disposed in spaced relationship to each other along a common axis.

9. The combination set forth in claim 7 in which each of the first and second coils is provided with an arcuate configuration and in which the first and second coils are disposed in arcuately spaced relationship to each other.

10. The combination set forth in claim 3, including,
    first means operative upon the charged particles upon the movement of the charged particles into the first controlled space for inhibiting the movement of the charged particles out of the first controlled space, and
    second means operative upon the charged particles upon the movement of the charged particles into the second controlled space for inhibiting the movement of the charged particles out of the second controlled space.

11. The combination set forth in claim 3 wherein the first and second electrode means are linearly disposed from each other to obtain reciprocal movements of the charged particles between the first and second electrode means in accordance with the alternate applications of potentials to the first and second electrode means.

12. The combination set forth in claim 3 wherein the first and second electrode means are angularly displaced from each other to obtain angular movements of the charged particles in a particular direction between the first and second electrode means in accordance with the alternate applications of potentials to the first and second electrode means.

13. The combination set forth in claim 1 wherein the first and second electrodes are spaced linearly from each other to obtain a reciprocal movement of the charged particles between the first and second electrodes in accordance with the alternate applications of voltages to the first and second electrodes.

14. The combination set forth in claim 1 wherein the first and second electrodes are annularly displaced from each other to obtain annular movements of the charged particles in a particular and individual direction between the first and second electrodes in accordance with the alternate applications of voltages to the first and second electrodes.

References Cited by the Examiner

UNITED STATES PATENTS

| | | | |
|---|---|---|---|
| 2,755,014 | 7/1956 | Westendorp et al. | 230—69 |
| 2,920,235 | 1/1960 | Bell et al. | 315—111 |

JAMES W. LAWRENCE, *Primary Examiner.*

GEORGE N. WESTBY, DAVID J. GALVIN,
*Examiners.*

V. LAFRANCHI, *Assistant Examiner.*